US008475103B2

(12) United States Patent
Michalski et al.

(10) Patent No.: US 8,475,103 B2
(45) Date of Patent: Jul. 2, 2013

(54) SEALING WASHER ASSEMBLY FOR LARGE DIAMETER HOLES ON FLAT SURFACES

(75) Inventors: Jessica Lyn Michalski, Agawam, MA (US); Charles V. DeSantis, Somers, CT (US)

(73) Assignee: Hamilton Sundstand Corporation, Windsor Locks, CT (US)

( * ) Notice: Subject to any disclaimer, the term of this patent is extended or adjusted under 35 U.S.C. 154(b) by 356 days.

(21) Appl. No.: 12/964,220

(22) Filed: Dec. 9, 2010

(65) Prior Publication Data

US 2012/0148369 A1  Jun. 14, 2012

(51) Int. Cl.
*F16B 37/00* (2006.01)
(52) U.S. Cl.
USPC ........................................ 411/371.1; 411/369
(58) Field of Classification Search
USPC .... 411/371.1, 10, 11, 369, 531, 542; 174/138 D, 151, 801
See application file for complete search history.

(56) References Cited

U.S. PATENT DOCUMENTS

| | | | |
|---|---|---|---|
| 2,462,023 A * | 2/1949 | Johanson et al. | 403/24 |
| 2,858,156 A * | 10/1958 | Wootton | 277/642 |
| 3,096,678 A | 7/1963 | Devine et al. | |
| 3,153,971 A | 10/1964 | Lovisek | |
| 3,519,279 A | 7/1970 | Wagner | |
| 3,606,357 A * | 9/1971 | Yonkers | 411/537 |
| 4,026,183 A * | 5/1977 | Bart | 411/542 |
| 4,177,999 A * | 12/1979 | Raber | 411/542 |
| 4,280,390 A | 7/1981 | Murray | |
| 4,295,766 A * | 10/1981 | Shaw | 411/113 |
| 4,492,817 A * | 1/1985 | Selby | 174/152 R |
| 5,188,495 A | 2/1993 | Jones, Jr. | |
| 5,236,272 A * | 8/1993 | Hibbard | 403/24 |
| 5,957,641 A | 9/1999 | Bogatz et al. | |
| 6,244,807 B1 * | 6/2001 | Garcia | 411/369 |
| 6,979,162 B2 | 12/2005 | Kato | |
| 7,339,795 B2 * | 3/2008 | Hsu | 361/762 |

FOREIGN PATENT DOCUMENTS

EP          046941 A1    12/1991

OTHER PUBLICATIONS

European Search Report, mailed Mar. 28, 2012.

\* cited by examiner

*Primary Examiner* — Gary Estremsky
(74) *Attorney, Agent, or Firm* — Kinney & Lange, P.A.

(57) ABSTRACT

A sealing washer assembly includes a main washer with a bottom annular groove for a removable O-ring and a top recess for a sealing washer. A fastener such as a screw or bolt passes through the sealing washer and the main washer, into a hole in a mounting surface. When the fastener is tightened, the main washer is clamped to the mounting surface to create a metal-to-metal seal, the O-ring is deformed to create a seal between the main washer and the mounting surface, and the sealing washer is deformed to create a seal between the fastener and the main washer.

20 Claims, 3 Drawing Sheets

SEALING WASHER ASSEMBLY FOR LARGE DIAMETER HOLES ON FLAT SURFACES

BACKGROUND

The present invention relates generally to fastening mechanisms, and more particularly to washer assemblies capable of providing a seal against contaminant ingress.

Modern electronics packaging frequently incorporates many small components, each with associated tolerances. To secure these components, fasteners such as bolts or screws may be threaded into clearance holes. Although individual components usually have small tolerances, tolerance stack-up can be large for collections of components, necessitating larger diameter clearance holes than would otherwise be used for particular size fasteners.

In the past, sealing mechanisms for fasteners have worked by minimizing the gap between fasteners and clearance holes. This approach does not work where clearance holes are large compared to fasteners.

SUMMARY

The present invention is directed toward a sealing washer assembly including a main washer with a bottom annular groove for a removable O-ring and a top recess for a sealing washer. A fastener such as a bolt or screw passes through the sealing washer and the main washer, into a hole in a mounting surface. When the fastener is tightened, the main washer is clamped to the mounting surface in a metal-to-metal seal, the O-ring is deformed to create a seal between the main washer and the mounting surface, and the sealing washer is deformed to create a seal between the fastener and the main washer.

DETAILED DESCRIPTION

Figure 1A:
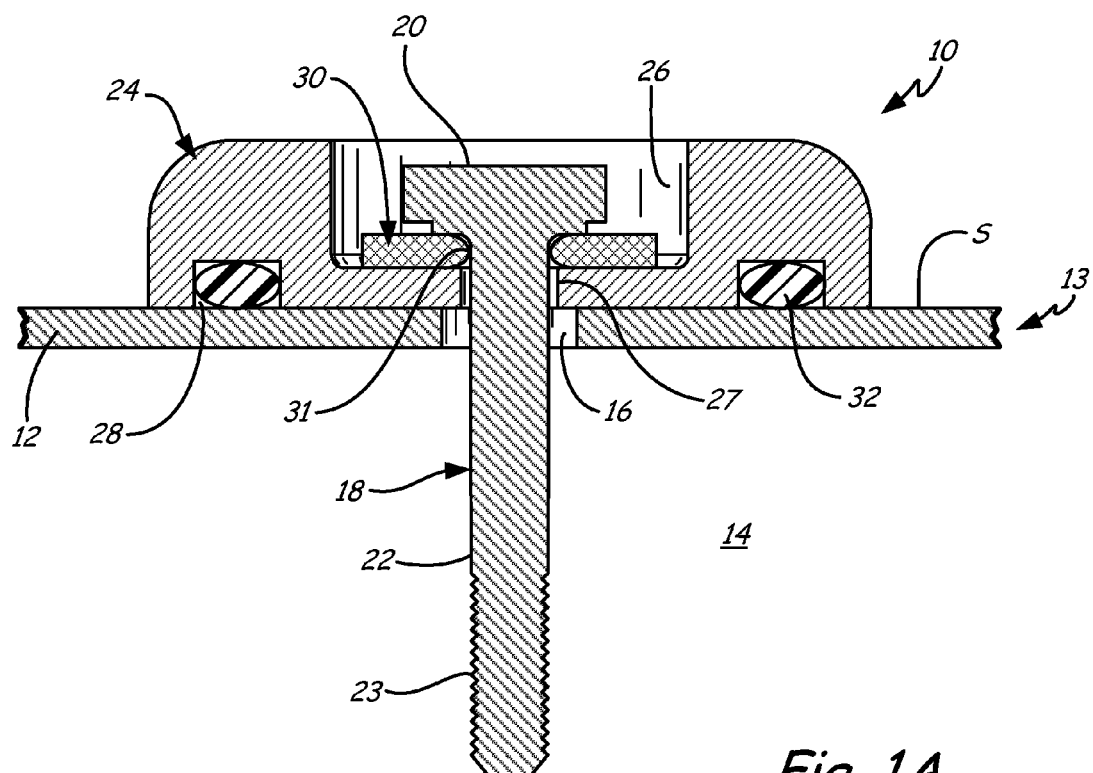
FIGS. 1A and 1B are cross-sectional and exploded views, respectively, of a mounting assembly of the present invention.
Figure 1B:
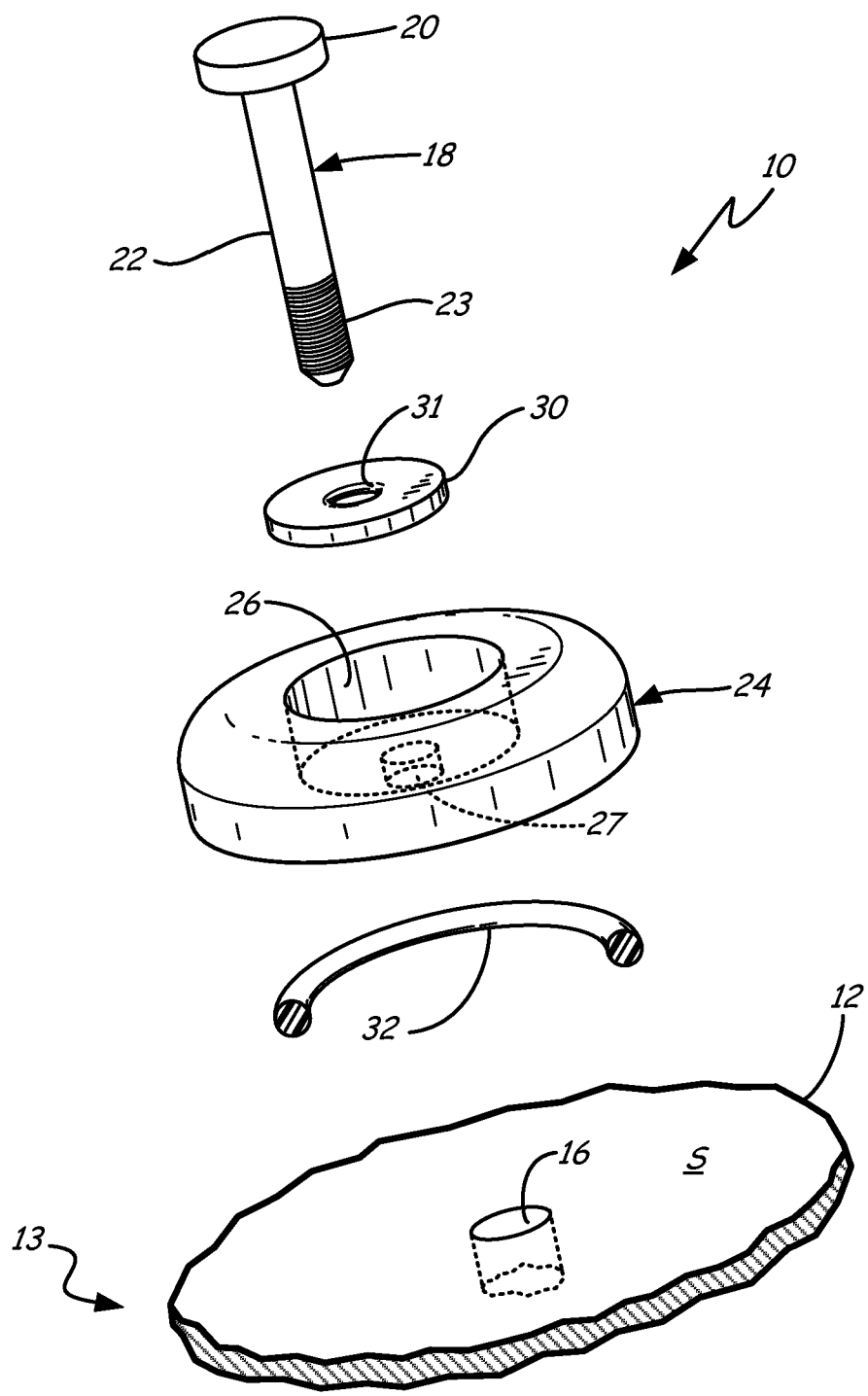

FIGS. 1A and 1B depict mounting assembly 10, which is used to secure cover 12 of housing 13, and to mount components within interior 14 of housing 13. Mounting hole (or aperture) 16 provides access through cover 12 into interior 14. Mounting assembly 10 includes fastener 18 with head 20 and shaft 22 (with threads 23), main washer 24 (with recess 26, hole 27, and annular groove 28), sealing washer 30 (with hole 31), and O-ring 32.

Mounting surface S is an outer surface of cover 12, encasing interior 14, which in one embodiment contains components such as printed circuit boards or other electronics to be kept free of contaminates. Mounting surface S is generally impermeable to contaminates, save at vulnerable locations such as hole 16, where openings are necessary so that screws or bolts such as fastener 18 can be inserted to connect together portions of housing 13. Fastener 18 may also lock or align components within interior 14. Because of tolerance requirements, the diameter of hole 16 may need to be large relative to fastener 18. Fastener 18 may be a bolt, screw, or other form of securing hardware, and has a head 20 and a shaft 22 which passes through hole 16 to fasten in interior 14. In one embodiment, fastener 18 is secured by threads 23 on shaft 22.

To prevent contaminant ingress into interior 14 through hole 16, main washer 24 is introduced between mounting surface S and head 20 of fastener 18. Main washer 24 may be, for instance, a machined steel disk with a central bore. When fastener 18 is secured, the bottom surface of main washer 24 rests flush atop mounting surface S. Recess 26 is located centrally in the top surface of main washer 24, and annular groove 28 is located in the bottom surface of main washer 24. The top corners of sealing washer 24 may be rounded so as not to snag, catch, or damage surroundings.

To prevent contaminant ingress between main washer 24 and head 20 of fastener 18, sealing washer 30 is introduced as shown, with shaft 22 passing through central hole 31 of sealing washer 30, hole 27 of main washer 24, and hole 16 in cover 12. Head 20 clamps sealing washer 30 tightly to main washer 24 when fastener 18 is secured. Sealing washer 30 is deformable to create a tight seal. In one embodiment, sealing washer 30 comprises a disk of rigid material such as steel, with a section or outer layer of deformable material such as fluorinated silicone. When fastener 18 is secured, sealing washer 30 deforms slightly as it is squeezed between head 20 and main washer 24, thereby creating a tight seal. In one embodiment, recess 26 is sufficiently deep that, when secured, fastener 18 does not protrude above the top surface of main washer 24, so as not to snag, catch, or damage surroundings.

To prevent contaminant ingress between main washer 24 and mounting surface S, O-ring 32 is introduced into annular groove 28. O-ring 32 is a deformable ring formed, for instance, of rubber or plastic. While undeformed, O-ring 32 does not fit entirely within annular groove 28. When fastener 18 is properly secured, however, O-ring 32 is compressed between main washer 24 and mounting surface S, and deforms to form a tight seal. O-ring 32 may be a separate, replaceable component not permanently attached to main washer 24.

When fastener 18 is fastened to a mounting structure in interior 14 of housing 12, head 20 is held tight into sealing washer 30 and thereby to main washer 24 in a seal, and O-ring 32 is compressed into annular groove 28, thereby providing a seal between main washer 24 and mounting surface S. In this way, contaminates are prevented from infiltrating interior 14 through hole 16, even where hole 16 has a large diameter relative to head 20 of fastener 18.

Figure 2:
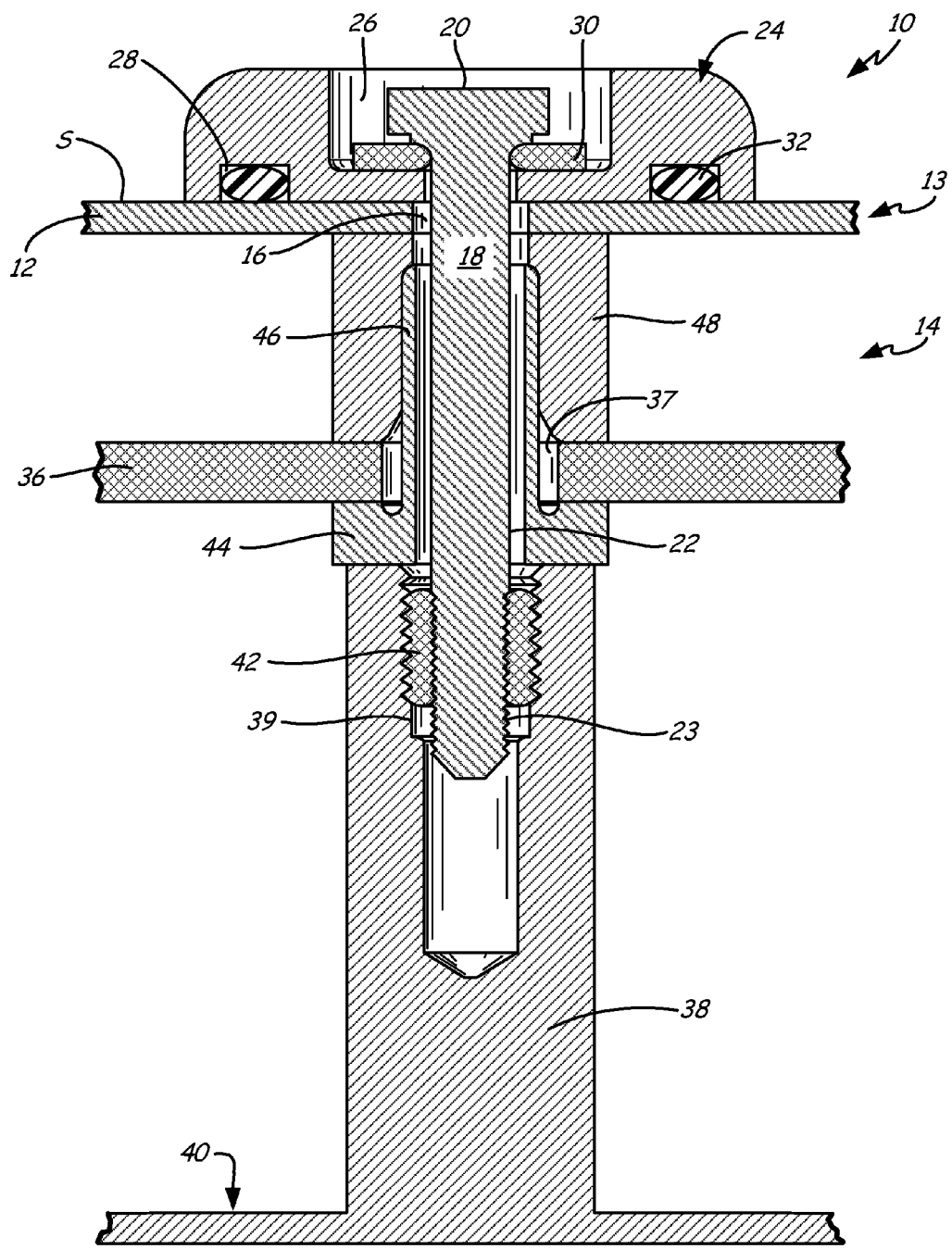
FIG. 2 is a cross-sectional view of another embodiment of a mounting assembly.

FIG. 2 illustrates an embodiment showing a portion of housing 13 and interior 14, and one manner in which fastener 18 can fasten into it. FIG. 2 depicts mounting assembly 10, cover 12 (with mounting surface S and hole 16), fastener 18 (with head 20 and shaft 22), main washer 24 (with recess 26 and annular groove 28), sealing washer 30, O-ring 32, printed circuit board 36 (with hole 37), base 40 of housing 13 (with post 38 having bore 39), threaded insert 42, bottom spacer 44 with upward extending tube or sleeve 46, and top spacer 48.

Main washer 24 and O-ring 32 rest atop mounting surface S, as previously described. Mounting surface S is the top surface of cover 12 of housing 13, which in one embodiment is a hard steel enclosure for electronic components. In the illustrated embodiment, shaft 22 of fastener 18 passes through hole 16 of in mounting surface S, through hole 37 in printed circuit board 36, and into bore 39 in post 38, where it is secured. Post 38 is an upward-extending portion of base 40, which protects, supports, and positions other components. Base 40 may be formed of a rigid material, such as steel or aluminum. In FIG. 2, shaft 22 is threaded into threaded insert 42, which is separately affixed in bore 39 of post 38. Threaded insert 42 may itself be threaded into bore 39, or may be attached by other means. Threaded insert 42 is useful where fastener 18 is of a harder material than post 38, for example if fastener 18 is a steel bolt, and post 38 is aluminum. In another embodiment, shaft 22 can be threaded directly into post 38.

Printed circuit board 36 and cover 12 are supported atop post 38 by bottom spacer 44 and top spacer 48. Printed circuit board 36 rests atop bottom spacer 44, which in turn is seated on post 38. Bottom spacer 44 is a thermal and electric conductor, capable of grounding printed circuit board 36 to post 38, and of passing excess heat away from printed circuit board 36. Bottom spacer 44 includes upward extending tube or sleeve 46, which passes through hole 37 in printed circuit board 36 to abut top spacer 48. Top spacer 48 rests atop printed circuit board 36, and supports cover 12. Top spacer 48 is aligned relative to bottom spacer 44 and printed circuit board 36 by upward extending tube 46. Top spacer 48 is a thermal conductor, capable of passing heat away from printed circuit board 36. When fastener 18 is secured, head 20 and main washer 24 clamp cover 12 and printed circuit board 36 into place above post 38. In another embodiment (not shown), additional printed circuit boards may be stacked, with intervening spacers, between base 40 and cover 12.

The sealing washer assembly disclosed herein prevents contaminate ingress into regions containing sensitive electronics, even where tolerance requirements necessitate large holes in casing components. This invention protects fastening hardware and minimizes edged protrusions from the housing surface. Additionally, sealing washer 30 and O-ring 32, the two components most likely to experience wear, are simple, inexpensive parts that can be replaced individually, as needed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   a mounting surface having an aperture;
   a main washer located on the mounting surface, the main washer having a top surface, a bottom surface, a central recess in the top surface, an annular groove in the bottom surface, and a central hole;
   an O-ring located in the annular groove;
   a sealing washer located in the central recess; and
   a fastener with a head and a shaft, the shaft passing through the sealing washer and main washer and secured so that a first seal is formed between the main washer and the mounting surface by clamping the bottom surface of the main washer tightly against the mounting surface, a second seal is formed between the main washer and the mounting surface by compressing the O-ring, and a third seal is formed between the head and the main washer by compressing the sealing washer, such that the head is situated within the central recess when secured.

2. The assembly of claim 1, wherein the central recess is deep enough that the head of the fastener does not protrude above the top surface of the main washer when the fastener is secured.

3. The assembly of claim 1, wherein at least a portion of the sealing washer is comprised of a deformable material which deforms to create a seal when compressed.

4. The assembly of claim 1, further comprising:
   at least one printed circuit board having a hole through which the shaft passes; and
   at least one spacer located on the shaft and adjacent to the printed circuit board.

5. The assembly of claim 4, wherein the spacer is a thermal conductor.

6. The assembly of claim 4, wherein the spacer is an electrical conductor.

7. An assembly comprising:
   a housing including a base, a cover, a hole in the cover, and a threaded receptacle in the base aligned with the hole in the cover;
   a main washer located on the cover, the main washer having a top surface, a bottom surface, a central recess in the top surface, an annular groove in the bottom surface, and a central hole;
   an O-ring located in the annular groove;
   a sealing washer located in the central recess; and
   a fastener with a head and a shaft, the shaft passing through the sealing washer and main washer and secured in the threaded receptacle so that a first seal is formed between the main washer and the cover by clamping the bottom surface of the main washer tightly against the cover, a second seal is formed between the main washer and the cover by compressing the O-ring, and a third seal is formed between the head and the main washer by compressing the sealing washer, such that the head is situated within the central recess when secured.

8. The assembly of claim 7, wherein the threaded receptacle is located in a fastening post of the base.

9. The assembly of claim 7, further comprising a component positioned within the housing, the component having a hole through which the shaft passes.

10. The assembly of claim 9 wherein the component comprises a printed circuit board.

11. The assembly of claim 9, further comprising at least one spacer located on the shaft and adjacent to the component.

12. The assembly of claim 11, wherein the spacer is a thermal conductor.

13. The assembly of claim 11, wherein the spacer is an electrical conductor.

14. The assembly of claim 7, further comprising an insert threaded into the threaded receptacle, wherein the threaded fastener is secured in the threaded receptacle by threading into the insert.

15. A method for securing a component within a housing having a base, a cover, a hole in the cover, and a threaded receptacle in the base, comprising:
   positioning the component over the threaded receptacle of the base;
   positioning the cover over the component so that the hole in the cover is aligned with the threaded receptacle;
   aligning a washer assembly with the hole in the cover, the washer assembly including a main washer having a top surface, a bottom surface, a central recess in the top surface, an annular groove in the bottom surface, and a central bore, an O-ring positioned in the annular groove, and a sealing washer positioned in the central recess;
   inserting a threaded shaft of a fastener through the sealing washer, the main washer, and the hole in the cover; and
   threading the shaft into the threaded receptacle such that a head of the fastener is situated within the central recess when secured, thereby clamping the main washer flush atop the cover to create a metal-to-metal seal, compressing the sealing washer to create a seal between the head of the fastener and the main washer, and compressing the O-ring to create a seal between the main washer and the cover.

16. The method of claim 15, and further comprising:
inserting a spacer on the shaft between the cover and the component.

17. The method of claim 16, wherein the spacer is a thermal conductor.

18. The method of claim 15, and further comprising:
inserting a spacer on the shaft between the component and the threaded receptacle.

19. The method of claim 15, wherein threading the shaft into the threaded receptacle comprises threading the shaft into a threaded insert which is threaded into the threaded receptacle.

20. The method of claim 15, wherein the sealing washer is a composite washer formed of a rigid material at least partially coated with a deformable material.

* * * * *